Feb. 19, 1963 R. W. SCHWARZE 3,077,799

PROGRAMMED APPARATUS

Filed June 27, 1960 3 Sheets-Sheet 1

RALPH W. SCHWARZE
*INVENTOR*

BY *[signature]*
*ATTORNEY*

Feb. 19, 1963 R. W. SCHWARZE 3,077,799

PROGRAMMED APPARATUS

Filed June 27, 1960 3 Sheets-Sheet 2

RALPH W. SCHWARZE
*INVENTOR*

BY Fehr and Swain
*ATTORNEY*

RALPH W. SCHWARZE
INVENTOR

BY Lehr and Swain
ATTORNEY

United States Patent Office 3,077,799
Patented Feb. 19, 1963

3,077,799
PROGRAMMED APPARATUS

Ralph W. Schwarze, Los Altos Hills, Calif., assignor to Develop-Amatic Engineering, a corporation of California Filed June 27, 1960, Ser. No. 39,040
7 Claims. (Cl. 77—32.2)

This invention relates generally to a programmed apparatus and more particularly to an apparatus which may be programmed to operate, such as drill, in a preselected pattern.

In many applications, it is necessary to drill a plurality of accurately located spaced holes in a work piece. If a large number of pieces is required, it is economical to employ ganged drills. However, there are many occasions where a limited number of pieces is required. In such instances, it may be more economical to have an operator individually drill the holes.

In the electronic art, for example, there has been a widespread use of printed circuit wiring. As is well known, in printed circuit wiring, a thin foil is adhered to an insulated backing and predetermined portions of the foil are then removed as, for example, by etching, leaving a conductive pattern. The backing and foil pattern is then drilled at selected points to receive terminal leads of electrical components. The conductive pattern makes the necessary conductive connections.

In many applications, only a limited number of boards is required as, for example, in breadboard and prototype work. This does not warrant the design and construction of a special ganged drill.

It is often desirable to insert eyelets at each of said holes.

It is a general object of the present invention to provide an apparatus which may be programmed to operate, such as drill holes, in a predetermined pattern.

It is another object of the present invention to provide a drill which includes a movable table selectively positioned in response to an operating program.

It is another object of the present invention to provide a programmed apparatus which includes replaceable positive stops which may be preselected to set up a program and which are sequentially presented to a mechanism which controls the relative position of a work piece and operating head.

It is another object of the present invention to provide an apparatus which can be easily programmed to operate at locations which have been previously located on a drawing having a compatible coordinate system.

The foregoing and other objects are, in general, accomplished by controlling the relative position of a work piece with respect to an operating head with a mechanism which includes a plurality of replaceable positive stops which are sequentially presented to the mechanism to control the relative position of the work piece in accordance with a preselected program.

The following description taken in conjunction with the accompanying drawing will more completely describe the invention and bring out other objects and features.

Referring to the drawing.

Figure 1:
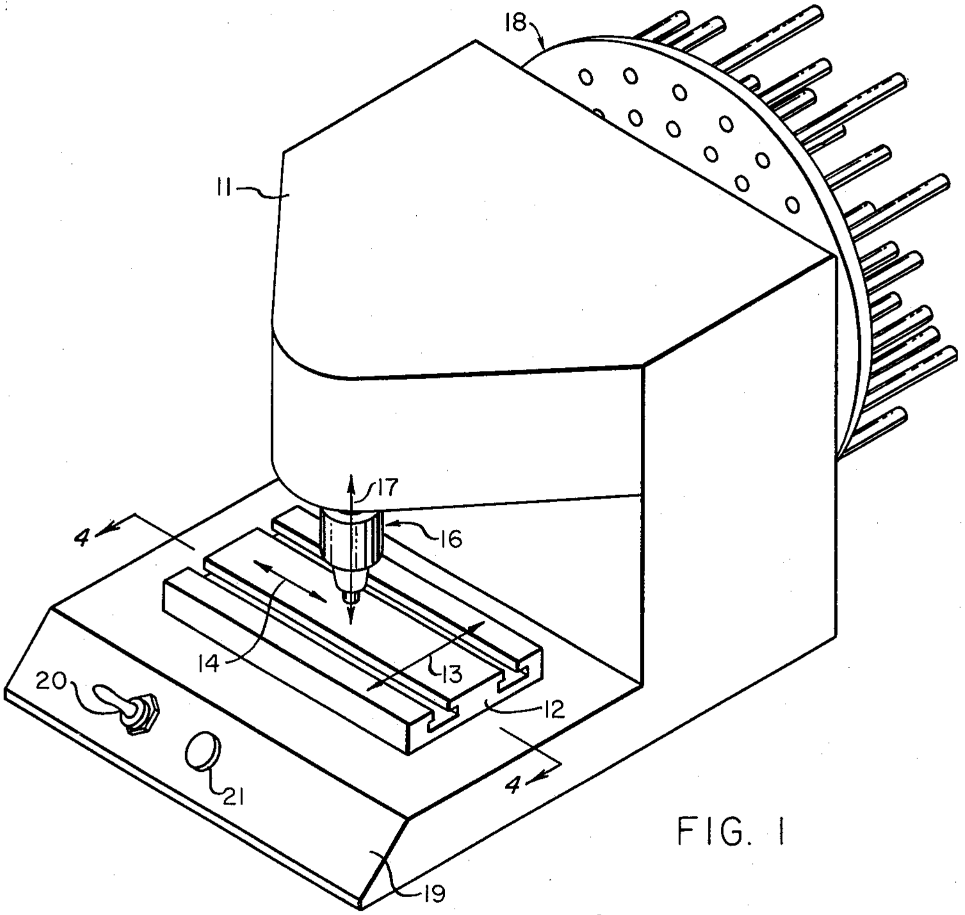
FIGURE 1 is a perspective view showing a drilling apparatus in accordance with the present invention.

The apparatus illustrated includes a housing 11 which encloses the working parts. A table 12 is supported above the housing. The table is carried by guides, to be presently described, disposed within the housing, for movement in X and Y directions 13 and 14, respectively.

To facilitate understanding of the invention, a programmed drill is described. However, it is clear that other operating heads may be employed, for example, an eyelet head or a riveting head. A drill 16 is carried within the portion of the housing projecting over the table 12. The drill is adapted to move in the vertical direction as indicated by the arrow 17 to selectively drill holes, as will be presently described. A programming means 18 is carried at the rear of the housing. The front of the housing is inclined at 19 and serves to mount the control switch 20 and an indicator lamp 21.

Figure 2:
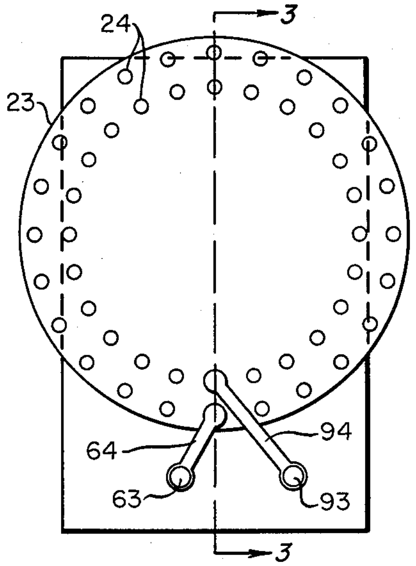
FIGURE 2 is a rear elevational view of the apparatus shown in FIGURE 1.

The programming plate 23 may be in the form of a disc, FIGURE 2, which includes a plurality of pairs of holes 24 lying on common radial lines. The holes are disposed in two concentric circles at the periphery of the plate 23.

The plate 23 is mounted on a shaft 25 which is journalled on the rear wall 26 by a bearing 27. The shaft 24 carries a rack 29 which is engaged by a reciprocating ratchet 31. The rack and ratchet are so arranged that for each reciprocation of the ratchet 31, the programming plate 23 is advanced through an angle corresponding to the angle between the radii through adjacent pairs of holes 24. The rack 29 may be actuated from an actuating pneumatic piston 32.

The end of the shaft carries suitable braking means which cooperate with the fixed braking assembly 36 to hold the plate 23 stationary between sequential indexed positions. The braking assembly 36 may, for example, carry a brake disc which cooperates with a brake disc carried by the shaft. An electromagnetic or pneumatic means may selectively apply braking pressure. Thus, there has been described means for sequentially advancing and locking the plate 23.

Alternatively, a linear geneva drive may be substituted for the ratchet 31 and brake 36 to provide positive indexing to the various positions and braking thereat.

The holes 24 formed in the programming plate are adapted to receive stops 38. The stops have predetermined accurate lengths which establish the X and Y positions of the table, as will be presently described. The stops include a shoulder 39 which abuts the plate to limit their longitudinal movement, while the portion 41 of reduced diameter is accommodated by the openings 24.

Figures 5, 6:
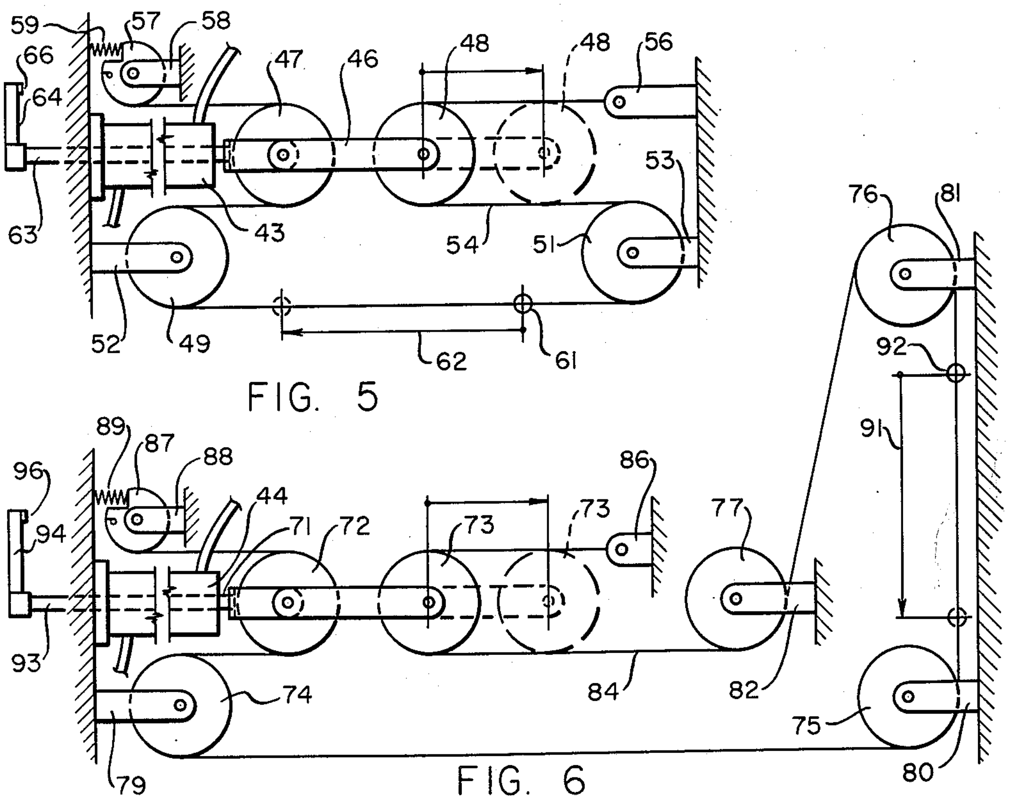
FIGURE 5 shows a drive for positioning the work piece along one coordinate axis.
FIGURE 6 shows a mechanism for positioning the work piece along another coordinate axis.

The table is pneumatically positioned in the X and Y directions by double acting cylinders 43 and 44, respectively, cooperating with a linear drive. Referring now to FIGURE 5, the piston of the double acting cylinder 43 is connected to linearly move the arm 46. The arm 46 rotatably carries a pair of spaced rollers 47 and 48. The arm 46 is moved between the positions as shown by the solid and dotted lines. Stationary rollers 49 and 51 are rotatably mounted on brackets 52 and 53, respectively, which are secured to the frame or housing. A band 54 has one end secured to the bracket 56. The band engages the roller 48 carried by the arm 46, the rotatable fixed roller 51, rotatable fixed roller 49 and the roller 47 carried by the arm 46. The other end of the band terminates on a roller 57 mounted on the housing by a bracket 58. The roller 57 is spring loaded 59 so that it is urged in a clockwise direction to maintain a predetermined tension in the band 54. The portion of the band 54 extending between the idler rollers 49 and 51 is connected as indicated at 61 to drive or move the table. Due to the loop about the movable roller 48, one unit of linear movement by the roller 48, or arm 46, will cause two units of linear movement of the band at 61. Thus, a two to one ratio increase is provided.

Operation of the drive described is as follows. As the piston moves forward, the portion of the tape between the idler rollers 49 and 51 will move to the left as indicated by the arrow 62 thereby moving the table towards the rear of the machine as viewed in FIGURE 1. Thus, it is seen that by activating the double acting cylinder 43, it is possible to move the table in the X direction. In accordance with the present invention, the moving piston is secured to a rod 63 which extends outwardly from the rear of the apparatus and which has an arm 64 secured thereto. The upper portion of the arm 64 includes an anvil 66. The arm 64 is disposed so that as the piston moves forward, the anvil 66 strikes the end of the adjacent stop 38. Further motion of the piston is prevented. The pneumatic pressure driving the piston forward maintains the anvil seated against the stop so that the position of the table is accurately maintained.

A similar driving arrangement is employed for positioning the table in the Y direction. Thus, the double acting cylinder 44 has a piston 71 which mounts the idler rolls 72 and 73 between the positions shown in solid and dotted lines for the idler roll 73. Fixed rolls 74, 75, 76 and 77 are rotatably supported from the housing by brackets 79, 80, 81 and 82, respectively. One end of band 84 is secured to the bracket 86, while the other end passes over the various idler pulleys, as shown in FIGURE 6, and is secured to the roller 87 rotatably mounted on the bracket 88 and spring loaded 89. As previously described, arrangement of the roll 87 and spring 89 serves to provide predetermined tension to the band.

It is seen that as the piston moves to the right, the band is moved in the direction shown by the arrow 91. The table may be driven by securing to the band at 92.

The piston includes a rod 93 which carries an arm 94 and anvil 96 adapted to engage the end of the associated stop 38 to limit the amount of travel of the piston. Thus, there is positive positioning in the X direction also.

Rather than using rollers and bands to provide movement of the table 12 in the X and Y coordinate directions, it is apparent that a system of levers may be used as an alternative.

Figure 4:
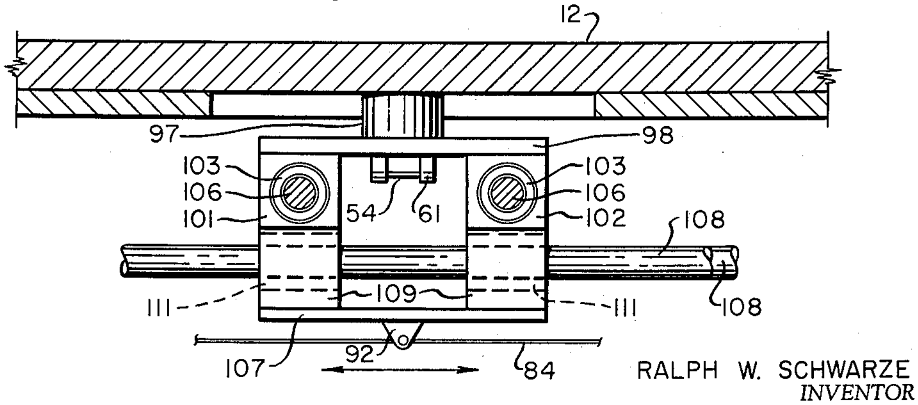
FIGURE 4 is a sectional view taken along the line 4—4 of FIGURE 1.

The table 12 is carried on a mounting member 97 which extends downwardly from the table and engages plate 98 (FIGURE 4). Spaced blocks 101 and 102 are secured to the plate. The blocks accommodate linear bearings 103. Spaced rods 106 are received within the bearings 103 and guide the table for horizontal movement in the X direction. The rods 106 are supported at their ends by an extension (not shown) of the plate 107. The band 54 is secured at 61 to the plate 98. Spaced rods 108 are mounted to the housing to guide in the Y direction. Blocks 109 are mounted on the plate and accommodate linear bearings 111 which receive the rods 108. The plate 107 is secured to the band 84 at 92.

Figure 3:
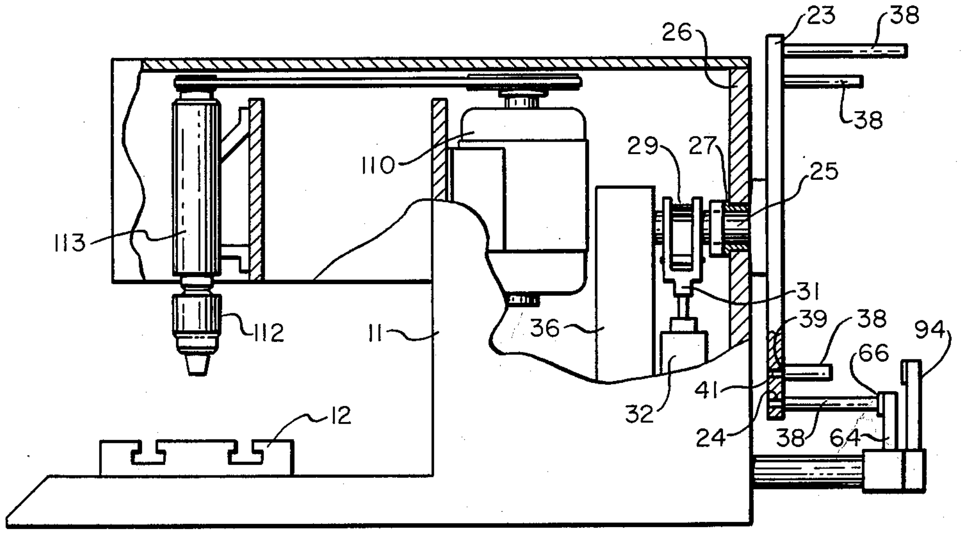
FIGURE 3 is a side elevational view, partly in section, of the apparatus.

Referring to FIGURE 3, the drill is driven from a motor 110 suitably mounted within the housing. The chuck 112 is carried by a mechanism 113 which is pneumatically operated (not shown) to move in a vertical direction as it is being driven. The pneumatic arrangement includes a double acting cylinder together with appropriate solenoid valves. Pneumatic controlled drilling units of this type are commercially available, for example, a suitable unit is known as an Automatic Drill Head sold by The Dumore Company of Racine, Wisconsin.

Thus, there is provided means for moving the table in the X and Y directions and means for vertically moving the drill. By sequentially moving the table and drill, it is then possible to drill at predetermined points.

Figure 7:
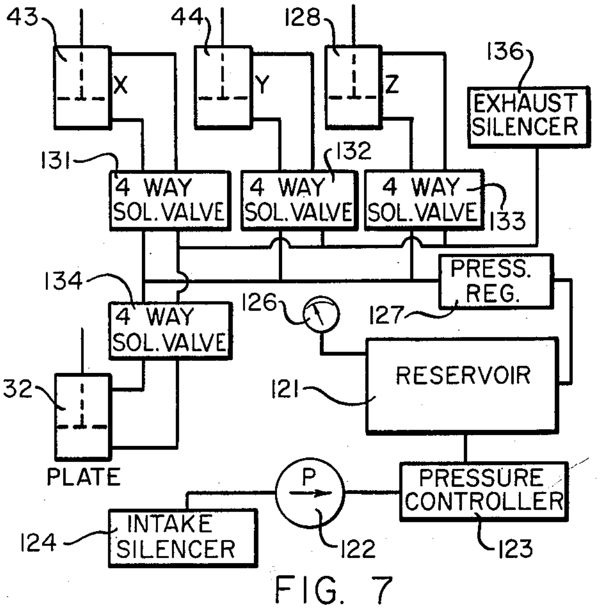
FIGURE 7 shows schematically the pneumatic circuit for operating the machine.

Referring to FIGURE 7, the pneumatic circuit for moving the various pistons in response to control signals is shown. A reservoir 121 has air supplied thereto under pressure by a pump 122 which feeds the reservoir through a pressure controller 123. A silencer 124 may be provided at the intake of the pump. A pressure indicating gauge 126 may be provided. The pneumatic pressure is applied through a pressure regulator 127 to the solenoid valves 131—134 and thence to the double acting cylinders 32, 43, 44 and 128. The double acting cylinder 128 represents the double acting cylinder serving to move the drill. Pressure is applied to the double acting cylinder 32 to index the programming plate. The solenoid valves 131, 132, 133 and 134 selectively apply pressure to the double acting cylinder in response to electrical signals from the control circuit to be presently described. The exhaust of the various valves may be connected to an exhaust silencer 136.

Figure 8:
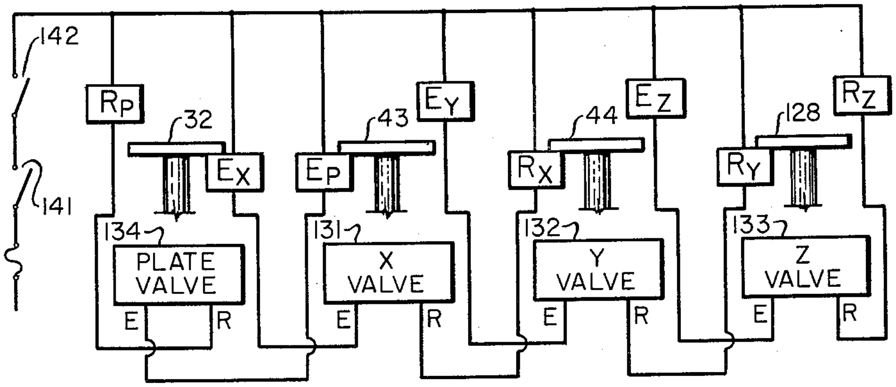
FIGURE 8 shows schematically the electrical circuit for operating the machine.

Referring to FIGURE 8, there is illustrated the electrical circuit for controlling the operation of the various solenoids. The circuit illustrated includes a plurality of switches marked with the letter E for extend and R for retract signifying that the solenoid piston is moved either to extend the piston shaft or retract it. The subscript signifies which piston is being controlled. Thus, $E_p$ refers to the switch which energizes the plate indexing solenoid valve to extend the indexing plate piston shaft to engage the ratchet 31. $R_p$ refers to the switch which reverses the valve to retract the piston and advance the plate one step forward. $E_x$ refers to the switch which controls the $x$ solenoid valve to move the piston in a direction to bring the anvil against the stop. $R_x$ refers to moving the piston in the opposite direction to permit advancement of the programming plate. Similarly, $E_y$ and $R_y$ refer to switches which control the $y$ solenoid valve to move the piston to engage and release the $y$ anvil. $E_z$ and $R_z$ refer to switches which control the drill head solenoid valve to advance and retract the drill.

The switches are activated as the various associated members reach their extreme positions. Thus, the switch $E_x$ is activated when the plate piston is retracted. The sequence of activation of the switches may more clearly be understood from the following description of a cycle of operation. Initially, cylinder 32 is partially extended and each of the cylinders 43, 44 and 128 are in the retracted position. Assume that the work piece has just been inserted and that the program has been selected by placement of the appropriate stops. The switch 141 is closed and the plate valve is energized through $E_p$ to apply pressure to the cylinder 32 and engage the ratchet. When the ratchet is extended, $R_p$ is activated causing pressure in the cylinder 32 to return the ratchet and advance the programming plate. The switch $E_x$ is then activated causing pressure in cylinder 43 to move the anvil 66 against the respective stop to index the table in the X direction. When the anvil 66 strikes the stop, $E_y$ is activated to move the anvil 96 against its respective stop to index the table in the Y direction. When the anvil 96 strikes the stop, the switch $E_z$ is activated to cause pressure in cylinder 128 to advance the drill.

When the drill is fully extended, the switch $R_z$ is activated to cause the drill to retract. When it is retracted, it activates switch $R_y$ to return the anvil to its starting position. Switches $R_x$ and $E_p$ are then activated in sequence to retract the anvil 66 and to engage the ratchet. The cycle of operation is then repeated. Switch means may be associated with the programming plate to turn off the apparatus upon completion of a drilling cycle and while the cylinder 32 is between its extended and retracted positions.

Operation of the apparatus to drill holes in a programmed sequence is substantially as follows. A drawing is prepared on a suitable coordinate system which indicates the X and Y location of each of the various holes to be drilled. Pins which have been formed of accurate lengths for each of a plurality of X and Y positions are selected and placed in pairs in the spaced holes on the periphery of the programming plate. Thus, with the aid of drawings and appropriately marked pins, it is possible to set up any programmed sequence desired. Once the pins have been placed in the programming disc, the apparatus is turned on and it will automatically cycle itself until the last programmed hole is reached, at which time the complete apparatus is de-energized.

It is apparent that the apparatus can be made to move other operating heads in accordance with a selected program. Further, the operating head may be moved in the X and Y directions and the work piece remain stationary. Either the work piece or head may be moved in the Z direction. Thus, there is provided a programmed apparatus which is simple in construction and accurate in operation. The program can be easily set in and can be taken right off of a properly prepared drawing.

I claim:

1. A programmed apparatus comprising operating means, means for selectively moving said operating means to operate on an article presented thereto, a table adapted to carry an article for presentation to the operating means, said table being mounted for movement in first and second directions in a coordinate system, first and second motive means for moving the table in said first and second directions, each of said motive means including a member which moves between an extended and retracted position, programming means including a plurality of pairs of removable first and second stops, each of said pair of stops being indicative of a single position of said table in the coordinate system, cooperating means carried by each said motive means member each adapted to cooperate with one of the stops of the pairs to limit the movement in the extended direction, means responsive to the retraction of at least one of said members for advancing the programming means to present another pair of stops when the members are retracted, whereby a new position of the table in said coordinate system is determined, and means for advancing the operating means when the cooperating means cooperate with the stops and the table is positioned.

2. An apparatus as in claim 1 wherein said motive means are pneumatic cylinders.

3. An apparatus as in claim 1 wherein said pairs of stops are mounted on an indexing plate which is sequentially advanced to present the stops to the cooperating means.

4. A programmed apparatus comprising operating means, means for selectively causing the operating means to operate upon an article applied thereto, a table adapted to carry the article to be operated upon, said table having a starting position relative to the operating means, motive means for imparting relative movement between said operating means and said table from said starting position, means for resuming the relative position of the operating means and the table to said starting position, programming means including stops for limiting the movement imparted by said motive means and thus controlling the relative movement between the operating means and the table from said starting position, and means responsive to the return of said table to the starting position for sequentially advancing the programming means to thereby sequentially control the relative position in accordance with a preset program.

5. Programmed apparatus as defined in claim 4 wherein each of said motive means comprises a rod movable between retracted and extended positions, an anvil secured to said rod and facing the direction of the rod's movement, means responsive to the movement of said rod for changing the relative position of the operating means and the table; said programming means comprising means movable past a fixed point in a direction transverse to the movement of said rod, said stops removably positioned on said last named means extending in a direction parallel to the movement of said rods; and means for selectively retaining the position of said means movable past the fixed points such that one of said stops is aligned with said anvil whereby the movement of said rods is limited.

6. A programmed apparatus comprising operating means, means for selectively causing said operating means to operate upon an article applied thereto, a movable table adapted to carry the article to be operated upon, said table having a starting position, motive means for moving the table to and from said starting position, means for returning the table to its starting position, programming means including stops for limiting the movement imparted by said motive means and thus controlling the movement of the table from said starting position, and means responsive to the return of the table to its starting position for sequentially advancing the programming means to thereby sequentially control the movement of the table in accordance with the preset program.

7. A programmed apparatus comprising operating means, means for selectively causing the operating means to operate upon an article applied thereto, a movable table adapted to carry the article to be operated upon for presentation to the operating means, said table being movable in first and second directions in a coordinate system and having a starting position with respect to each of said first and second directions, first and second motive means for moving the table in said first and second directions, programming means cooperating with said first and second motive means and including stops for limiting the movement imparted by said motive means to control the movement of said table in each of said first and second directions from said starting position in accordance with the preselected program, said programming means including a plurality of pairs of stops, each of said pairs of stops being indicative of a single position of said table in the coordinate system, means connected to each of said first and second motive means cooperating simultaneously with a single pair of said stops to limit the movement of the table by the motive means in said first and second directions, and means responsive to the return of the table to its starting position in each of said directions for sequentially presenting the pairs of stops to the cooperating means.

References Cited in the file of this patent

UNITED STATES PATENTS

| | | |
|---|---|---|
| 2,870,660 | Chausson | Jan. 27, 1959 |
| 2,932,088 | Knosp | Apr. 12, 1960 |

FOREIGN PATENTS

| | | |
|---|---|---|
| 1,025,784 | France | Jan. 28, 1953 |
| 707,516 | Great Britain | Apr. 21, 1954 |